United States Patent [19]
Chapman
[11] Patent Number: 4,521,464
[45] Date of Patent: Jun. 4, 1985

[54] DECORATIVE PLATE APPARATUS

[75] Inventor: G. Paul Chapman, Marietta, Ga.
[73] Assignee: Decorative Designs, Inc., Atlanta, Ga.

[21] Appl. No.: 531,954
[22] Filed: Sep. 14, 1983
[51] Int. Cl.[3] .......... B32B 3/00; B32B 3/02
[52] U.S. Cl. .......... 428/33; 428/65; 428/192; 428/543
[58] Field of Search .......... 428/65, 192, 543, 33, 428/188; 52/578, 588, 595; 174/66; 220/241

[56] References Cited

U.S. PATENT DOCUMENTS 636,943 11/1899 Beaton .......... 126/317
773,445 10/1904 Willetts .
1,124,210 1/1915 Christian .......... 126/317
1,278,895 9/1918 Farley .......... 126/315
2,918,151 12/1959 Kennedy .......... 52/588
3,077,426 2/1963 Johnston .......... 181/286
3,197,934 8/1965 Brown .......... 52/595
3,679,531 4/1969 Wienand et al. .......... 428/33

*Primary Examiner*—Paul J. Thibodeau
*Attorney, Agent, or Firm*—Jones & Askew

[57] ABSTRACT

A decorative plate apparatus comprising two or more plate sections, each plate section formed with an integrally formed male extension and an integrally formed female receptacle for securing the plates one to the other. The present plate apparatus further includes an opening through which the mounting devices and electrical connections of an existing electric fixture may extend.

5 Claims, 5 Drawing Figures

DECORATIVE PLATE APPARATUS

TECHNICAL FIELD

The present invention relates to decorative furnishings, and more particularly, relates to an improved decorative plate apparatus for fixtures depending from a ceiling, wall or floor.

BACKGROUND OF THE INVENTION

Electric fixtures such as a chandelier, a ceiling fan or a light fixture often are mounted to extend from a ceiling, wall or floor. Such an arrangement necessitates that an opening be made in the ceiling, wall or floor to mount and electrically connect the fixture to a power source. A small canopy or the like is typically provided with the fixture to cover this opening. Many times, however, the canopy provided with the fixture is too small to cover the opening. Moreover, it is often desired to provide an additional decorative furnishing to enhance the appearance of the fixture. Thus, it is often desired to provide a decorative plate that fits about the canopy so as to fully cover any opening in the surface immediately behind or above the canopy, and to increase the aesthetic appeal of the fixture.

Various types of decorative plates are known in the prior art purporting to fulfill this need. For example, it is known to provide a unitary decorative plate member with an aperture of sufficient dimension to receive the canopy of a fixture. As a further example, U.S. Pat. No. 636,943 discloses a decorative plate consisting of two halves held together by a lug assembly on the backside of the plate. U.S. Pat. No. 773,445 discloses yet another decorative plate consisting of two halves. This plate is held together by holding pins, also located on the backside of the plate.

Problems exist in the use of such prior art plates. The unitary plate member is preferably installed simultaneously with the new fixture. To install the unitary plate with an existing electric fixture, the fixture must be completely dismounted and electrically disconnected, and then remounted and reconnected with the plate above or behind the fixture. A problem with the devices disclosed in the cited patents is that the lug assembly and the holding pins are attached to the backside of the plate. Thus, the plate cannot be pressed flush against the ceiling, wall or floor. Furthermore, such lug assemblies and holding pins are difficult to manipulate when installing the plate. Yet another problem with these devices is that the component parts of the lug assembly and the holding pins are easily broken or otherwise detached from the plate. Without these attaching devices, the plate halves cannot be held together and the device is unusable.

The prior art has heretofore lacked a decorative plate that may be quickly and easily fitted to an existing fixture and pressed flush against a ceiling, wall or floor. The prior art has further heretofore lacked a plate formed in sections which could be held together without use of separate attachment devices such as holding pins, lug assemblies and the like.

SUMMARY OF THE PRESENT INVENTION

The present invention solves the above-described problems in the prior art by providing an improved decorative plate apparatus that is easily and quickly fitted to an existing electric fixture. The present invention further provides a decorative plate apparatus formed in several complementary partial sections, such as two half plate sections, with integral means for securing the plate sections together without separate attachment devices. A decorative plate apparatus according to the present invention may furthermore be pressed flush against a ceiling, wall or floor so as to provide a maximum aesthetic appeal.

Generally described, the decorative plate apparatus of the present invention comprises a number of sections formed to be intimately engaged and fitted about a canopy of an electric fixture. Described somewhat more particularly, a decorative plate according to the present invention comprises a first plate section integrally formed with a male extension and a female receptacle, and a second plate section integrally formed with a male extension and a female receptacle, whereby simultaneous engagement of the male extension of the first plate section with the female receptacle of the second plate section, and the male extension of the second plate section with the female receptacle of the first plate section, secures the first plate section to the second plate section so as to form a unitary structure.

Thus, it is an object of the present invention to provide an improved decorative plate for an electric fixture.

It is a further object of the present invention to provide a decorative plate that is easily and quickly fitted about an existing electric fixture.

It is a further object of the present invention to provide a decorative plate apparatus formed in two or more sections that may be secured one to the other without additional attachment devices.

It is a further object of the present invention to provide a decorative plate apparatus formed in two or more sections that may be pressed flush against a ceiling, wall or floor.

It is a further object of the present invention to provide a decorative plate apparatus formed in two or more sections that may be secured and positively locked one to the other.

These and other objects, features and advantages will become apparent from a review of the following detailed description of the invention and the appended drawing and claims.

DETAILED DESCRIPTION

Figure 1:
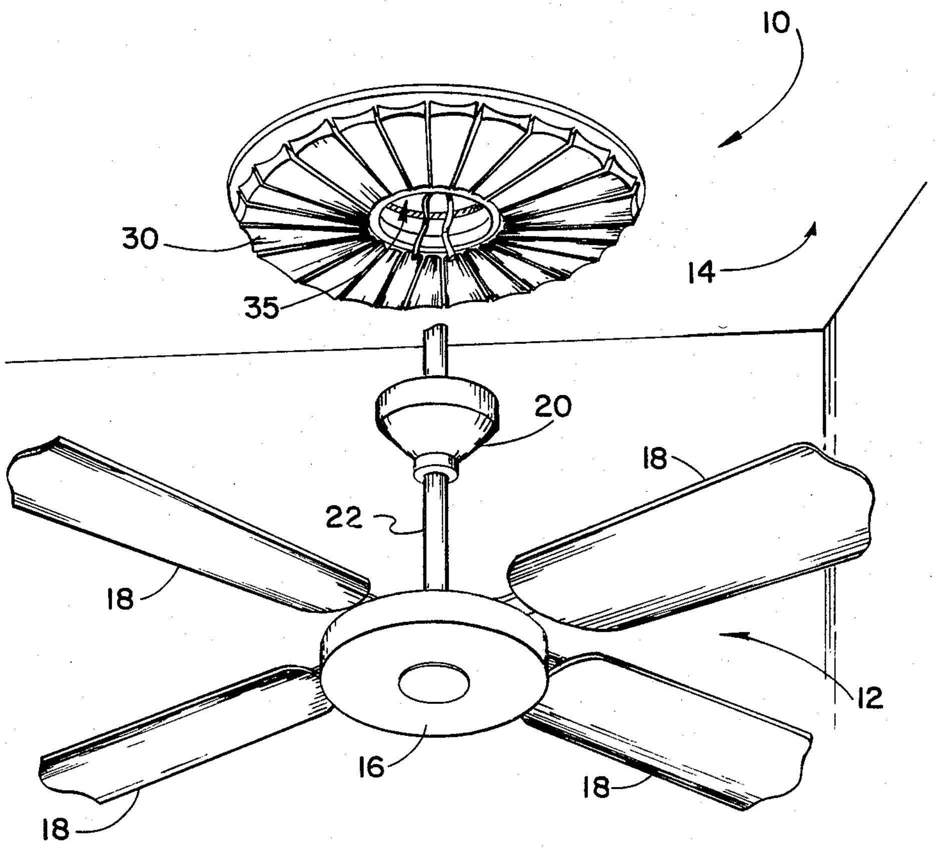
FIG. 1 is a pictorial view of an embodiment of a decorative plate apparatus according to the present invention, showing the apparatus mounted above a conventional ceiling fan.

Referring now in more detail to the drawing, in which like numerals indicate like parts throughout the several views, FIG. 1 shows a typical ceiling fan 12 depending from a ceiling wall 14. The ceiling fan 12 is mounted to a structural member above the ceiling wall 14 in the usual and well known manner. The fan 12 includes a motor assembly 16 that drives a plurality of blades 18. The motor 16 is electrically connected to a power source (not shown) in the usual and well known manner. The fan 12 is conventionally fitted with a canopy 20 at the uppermost section of a mounting rod 22. For purposes of illustration, the canopy 20 is shown lowered from the ceiling wall 14. Furthermore, while the preferred embodiment of the present invention is shown for use with a ceiling fan 12, those skilled in the art will appreciate that the present invention is adaptable for use with any fixture depending from a ceiling, or extending from a wall or floor.

Figure 3:
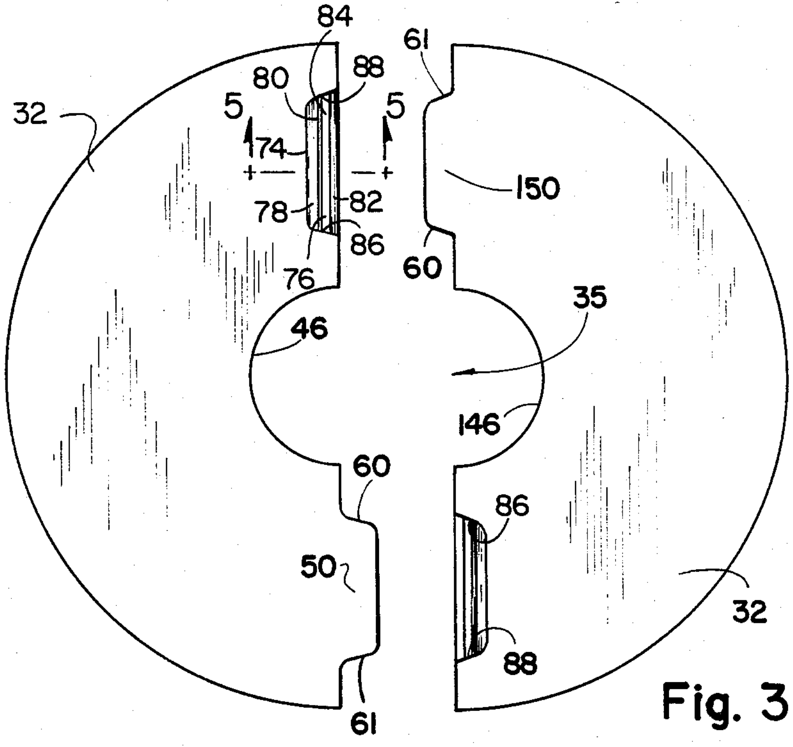
FIG. 3 is a rear plan view of the embodiment shown in FIG. 1, showing the two sections separated one from the other.

FIG. 1 further shows a decorative plate 10 according to a preferred embodiment of the present invention. The plate 10 is substantially round in shape and may be made of any suitable material. Suitable materials include, but are not limited to, wood, plastic and ceramic. The shape of the plate 10 may be modified in numerous ways. The plate 10 is formed with a front side 30 and a backside 32. As shown in FIG. 1, the front side 30 is ornately formed to provide a decorative appearance. Of course, the ornamental appearance of the front side 30 of the plate 10 may be modified as desired. The backside 32, as shown in FIG. 3, is a substantially flat, smooth surface. The backside 32 may include an adhesive region (not shown) to facilitate attachment of the plate apparatus 10 to the ceiling 14 as described in further detail below. An opening 35 is provided at the center of the plate 10. The opening 35 is of sufficient dimension to permit the mounting rod 22 and electrical connections (not shown) of the ceiling fan 12 to pass therethrough. The opening 35 is also of such dimension to be fully covered by the canopy 20 when in a raised position as described in detail below.

Figure 2:
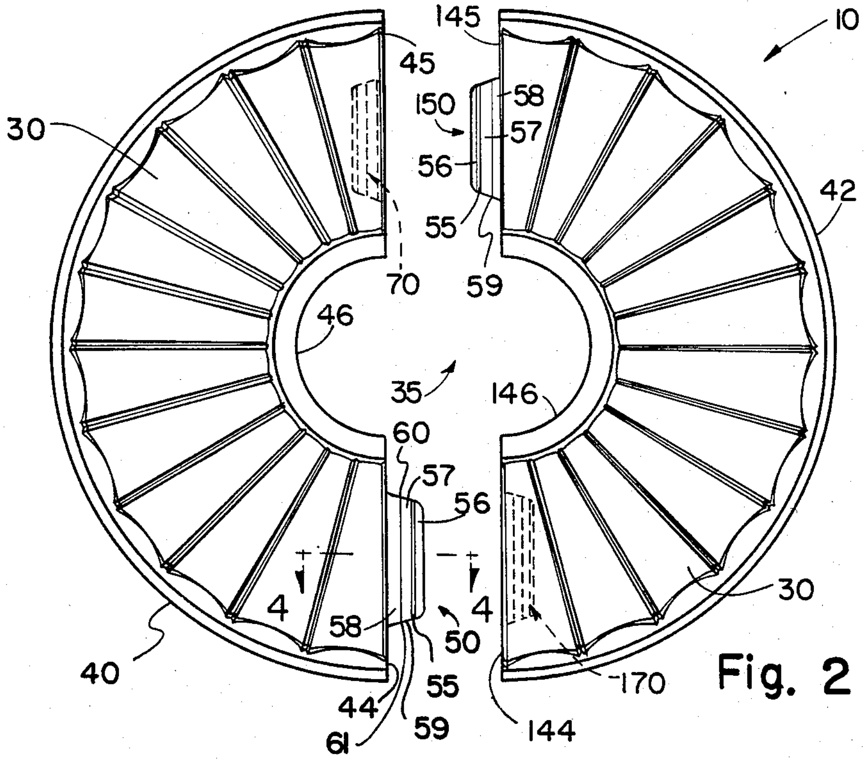
FIG. 2 is a front plan view of the embodiment shown in FIG. 1, showing the two sections separated one from the other.

As shown in FIG. 2, the preferred decorative plate apparatus 10 consists of two-semi-circular half plate sections 40 and 42. The plate sections 40 and 42 are each formed with a male extension 50 and 150, respectively, and a female receptacle 70 and 170, respectively. While the orientation of these members differs as described below, the plates 40 and 42 are otherwise identical, and only one is therefore described in detail.

Plate section 40 is characterized by two inner surfaces 44 and 45, and an indented arcuate portion 46. Plate section 40 is formed with a male extension 50 that extends outwardly from surface 44. As shown best in FIG. 4, the male extension 50 is generally L-shaped and preferably formed integrally with plate member 40. The male extension 50 includes a horizontal projection 52, the base edge of which is a continuation of the backside 32 of plate section 40. The male extension 50 also includes a vertical projection 54, formed with an upper horizontal surface 55 and two beveled surfaces 56 and 57. It is to be noted that the male extension 50 further includes a beveled surface 58 and a lower horizontal surface 59 which, in combination with beveled surface 57, forms a trough-like portion. The male extension 50 yet further includes two L-shaped end surfaces 60 and 61. As described below, the male extension 70 is configured for receipt by female receptacle 170.

The plate section 40 further includes a female receptacle 70. As shown best in FIG. 3 and FIG. 5, the preferred female receptacle 70 comprises a cavity 72 configured for receipt of the male extension 50. The cavity 72 is generally L-shaped and defined by a substantially vertical back wall surface 74 that engages the backside 32 of the plate 10 at a corner edge 75. The cavity 72 is further defined by beveled surfaces 76 and 78 which taper inwardly into the body of plate section 40 to meet a substantially horizontal surface 80. The female receptacle 70 also includes a beveled surface 82 and a horizontal surface 84 immediately adjacent to surfaces 45 and 76, respectively. The female receptacle 70 further includes two L-shaped end surfaces 86 and 88. As described in detail below, the male extension 50 and the female receptacle 70 operate to provide a positive locking action to the apparatus.

As shown in FIGS. 2 and 3, plate section 42 is characterized by two inner surfaces 144 and 145, and an indented arcuate surface portion 146. Plan surfaces 144 and 145 are configured to be correspondingly engaged to plan surfaces 44 and 45 of plate section 40. As noted above, plate section 42 is formed with a male extension 150 and a female receptacle 170 substantially identical to that described. Male extension 150 extends outwardly from surface 145 of plate section 42 so as to engage the female receptacle 70 formed in surface 45 of plate section 40. Similarly, female receptacle 170 is positioned adjacent to surface 44 of plate section 42 so as to receive male extension 50 extending from surface 44. Of course, many modifications of the male extensions 50 and 150 or the female receptacles 70 and 170 may be effected within the scope of the present invention. The most significant aspect is that the extensions and receptacles be integrally formed with the plate sections, and matingly configured so as to secure one plate section to the other plate section as described hereinbelow.

The present invention is used in the following manner. The canopy 20 of the ceiling fan 12 is lowered from the ceiling 14, but not disengaged from the rod 22. The plate sections 40 and 42 are positioned so as to place the rod 22 and any electrical connections (not shown) within the arcuate indented portions 46 and 146 of the plate sections. The backside 32 of the plate apparatus 10 is positioned facing the ceiling 14. The plate sections 40 and 42 are then aligned so as to insert the male extensions 50 and 150 into the female receptacles 70 and 170, respectively. This is accomplished by positioning the male extensions 50 and 150 immediately above the female receptacles 70 and 170, and twisting the plate sections 40 and 42 to engage the male extensions with the female receptacles.

Figure 4:
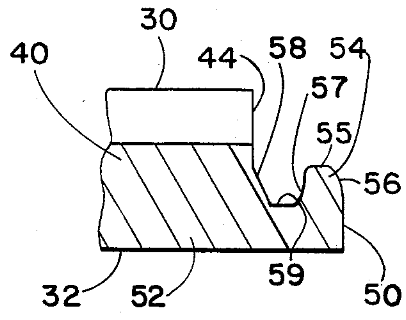
FIG. 4 is a cross-section view of the embodiment shown in FIG. 1, taken along line 4—4 of FIG. 2.
Figure 5:
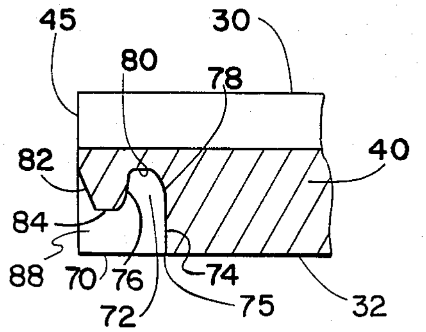
FIG. 5 is a cross-section view of the embodiment shown in FIG. 1, taken along line 5—5 of FIG. 3.

It will be appreciated that alignment of the arcuate portions 46 and 146 of the plates 40 and 42, respectively, provides an alignment device whereby the male extensions 50 and 150 are readily aligned with the female receptacles 70 and 170. It will be further appreciated that the cavity 72, as shown in FIG. 5, is configured for mating receipt of the male extension 50 as shown in FIG. 4. More particularly, surfaces 55, 56 and 57 engage surfaces 80, 78 and 76, respectively. Similarly, surfaces 82 and 84 of the female receptacles 70 and 170 engage surfaces 58 and 59, respectively, of the male extension 50 and 150. Thus, engagement of the male extension 50 with the female receptacle 170, and corresponding engagement of the male extension 150 with the female receptacle 70, secures the plate sections 40 and 42 together to form a unitary structure. The engagement of the above-described surfaces prevents the plate sections 40 and 42 from being pulled apart in a direction perpendicular to the line of intersection between surfaces 44 and 144, and 45 and 145. It is to be noted that male extension end surfaces 60 and 61 engage female receptacle end surfaces 86 and 88, respectively. The engagement of these surfaces prevents any movement of the plate sections 40 and 42 in a direction parallel to the line of intersection between surfaces 44 and 144 and 45 and 145. Further, the inner arcuate surfaces 46 and 146 of the plate sections 40 and 42 define the opening 35 in the plate 10 through which the mounting rod 22 and any electrical connections extend. The canopy 20 is then raised upon the mounting rod 22 into engagement with the plate apparatus 10 in the usual manner, so as to hold the plate apparatus 10 against the ceiling 14. As noted above, the back side 32 of the plate apparatus 10 may include an adhesive region to assist in securing the plate to the ceiling 14. The decorative front side 30 of the plate apparatus 10 faces away from the ceiling 14 so as to enhance the appearance of the fan 12.

Thus, it is seen that the present invention provides many advantages over prior art devices. The sectional construction of the present invention permits it to be readily adapted to an existing fixture. Furthermore, the plate sections of the present invention are quickly and easily secured one to the other without additional attaching devices to provide a unitary structure. Additionally, securing the two plate sections together by means of correspondingly and integrally formed male extensions and female receptacles provides for the apparatus to be pressed flush against a ceiling, wall or floor as heretofore unprovided for in the prior art. The novel sectional construction of the present invention also provides a plate apparatus that is easily and cost efficiently produced.

While this invention has been described in detail with particular reference to preferred embodiments thereof, it will be understood that variations and modifications can be effected within the spirit and scope of the invention as described hereinbefore and as defined in the appended claims.

I claim:

1. A decorative plate apparatus, comprising:

a first plate section having a substantially flat back side and an inner surface comprising two planar sections separated by an arcuate section, wherein one of said two planar sections includes an integrally formed male extension projecting outwardly from said inner surface and downwardly from said back side, and the other of said two planar sections includes an integrally formed female receptacle protruding inwardly of said inner surface and downwardly of said back side; and a second plate section having a substantially flat back side and an inner surface comprising two planar sections separated by an arcuate section, wherein one of said two planar sections includes an integrally formed male extension projecting outwardly from said inner surface and downwardly from said back side, and the other of said two planar sections includes an integrally formed female receptacle protruding inwardly of said inner surface and downwardly from said back side, whereby twisting said plate sections about an axis perpendicular to said inner surfaces engages said male extension of said first plate section with said female receptacle of said second plate section, and further engages said male extension of said second plate section with said female receptacle of said first plate section, thereby securing said first plate section to said second plate section to provide a unitary plate.

2. A decorative plate apparatus comprising:

a first plate section, said first plate section having a decorative front side and a substantially flat back side, and said first plate section defining two inner plane surfaces separated by an inner arcuate surface, wherein one of said two inner plane surfaces includes a first integrally formed, outwardly projecting inverted L-shaped male extension, said male extension being formed with a beveled downwardly projecting portion, and the other of said two inner plane surfaces includes a first integrally formed, inwardly protruding correspondingly configured female receptacle defining an inwardly and a downwardly protruding, inverted L-shaped cavity; and a second plate section, said second plate section having a decorative front side and a substantially flat back side, and said second plate defining two inner plane surfaces separated by an inner arcuate surface, wherein one of said two inner plane surfaces includes a second integrally formed, outwardly projecting inverted L-shaped male extension, said male extension being formed with a beveled downwardly projecting portion, and the other of said two inner plane surfaces includes a second integrally formed, inwardly protruding correspondingly configured female receptacle defining an inwardly and a downwardly protruding beveled cavity, whereby a twisting action of said first plate section relative to said second plate section causes engagement of said first male extension with said second female receptacle, and simultaneous engagement of said second male extension with said first female receptacle, and thereby secures said first plate section to said second plate section to form a unitary structure having a decorative front side and a substantially flat back side, said back side being suited to be fitted to a plane surface.

3. The decorative plate apparatus of claim 2 wherein said male extensions and said female receptacles are elongated along their respective inner surfaces.

4. The decorative plate apparatus of claim 2 wherein said first and second male extensions each further define a beveled trough portion at a point adjacent their respective inner surfaces, and said cavities of said first and second female receptacles each further define a beveled projection that extends downwardly into said cavities at kthe innermost portion of said female receptacles, whereby said beveled projections of said female receptacles are snugly received by said beveled trough portions of said male extensions so as to provide a positive locking engagement thereof.

5. The decorative plate apparatus of claim 4 wherein a portion of said first and second female extensions includes an upward protrusion adjacent their respective inner surfaces and said first and second male extensions include a trough adjacent their respective inner surfaces, thereby providing cooperating hook-like elements to secure said first and second plate sections.

* * * * *